UNITED STATES PATENT OFFICE

HENRY G. DAYTON, OF MAYSVILLE, KENTUCKY.

IMPROVEMENT IN DISINFECTING COMPOUNDS.

Specification forming part of Letters Patent No. 147,615, dated February 17, 1874; application filed February 11, 1874.

*To all whom it may concern:*

Be it known that I, HENRY G. DAYTON, of Maysville, in the county of Mason and State of Kentucky, have invented a new and valuable Improvement in Floating Disinfectant; and I do hereby declare that the following is a full, clear, and exact description of the construction of the same.

My invention relates to means for disinfecting stagnant water and other noisome and unwholesome substances; and it consists in the novel preparation of sawdust, and the treatment thereof by carbolic acid, substantially as hereinafter described.

I first take sawdust and subject it to such a degree of heat, in an oven or other suitable receptacle, as to drive away or evaporate the moisture thereof, and coagulate or harden its albumen. This heat is continued until the sawdust is not only thoroughly dried, but blackened and scorched, so as to present the external appearance of granulated charcoal. I next place it in a bath formed of a strong solution of sulphate of iron, and permit it to remain there until thoroughly saturated. I then remove it from the bath, and, after thorough drying, I place it in a bath of volatile distillate of coal-tar, such as is ordinarily used for disinfecting purposes, and allow it to remain there until it has absorbed all of that substance which it can hold. When this process is ended the disinfectant is ready for use.

I prefer the baths above mentioned to a treatment by sprinkling with the commodities named; but in case the latter only be employed, the sawdust so prepared has great efficiency.

It is obvious that when sawdust is treated in the manner described, either by bathing or sprinkling, it will preserve its buoyancy, and when strewed upon a fluid of the density of water will float upon the surface thereof. This buoyancy admirably adapts it to the purification of stagnant pools and to the bilge-water in the holds of vessels. It is apparent, also, that sawdust so prepared will be effective as an insect-destroyer, and will be found of great value in dispersing or destroying insects bred in stagnant water, such as mosquitoes.

I am aware that sawdust and charcoal have been saturated with carbolic acid, and that sulphate of iron has been used, both as a disinfectant and in the preservation of timber. I do not claim, broadly, the use of either substance; but

What I claim as new, and desire to secure by Letters Patent, is—

The floating disinfectant consisting of sawdust dried, scorched, and treated successively with sulphate of iron and volatile distillate of coal-tar, substantially as specified.

In testimony that I claim the above I have hereunto subscribed my name in the presence of two witnesses.

HENRY G. DAYTON.

Witnesses:
GEORGE E. UPHAM,
ROBERT EVERETT.